United States Patent
Shishido (10) Patent No.: US 9,715,081 B2
(45) Date of Patent: Jul. 25, 2017

(54) LENS BARREL

(71) Applicant: Olympus Corporation, Shibuya-ku, Tokyo (JP)

(72) Inventor: Hiroyuki Shishido, Hachioji, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/956,651

(22) Filed: Dec. 2, 2015

(65) Prior Publication Data

US 2016/0161704 A1    Jun. 9, 2016

(30) Foreign Application Priority Data

Dec. 5, 2014    (JP) ................... 2014-246959

(51) Int. Cl.
| | | |
|---|---|---|
| *G02B 15/14* | (2006.01) | |
| *G02B 7/10* | (2006.01) | |
| *G03B 3/00* | (2006.01) | |
| *G03B 17/12* | (2006.01) | |

(52) U.S. Cl.
CPC ............... *G02B 7/10* (2013.01); *G03B 3/00* (2013.01); *G03B 17/12* (2013.01)

(58) Field of Classification Search
CPC ............. G02B 7/10; G03B 3/00; G03B 17/12
USPC ........................................................ 359/700
See application file for complete search history.

(56) References Cited

U.S. PATENT DOCUMENTS

| | | | | |
|---|---|---|---|---|
| 2005/0265716 A1* | 12/2005 | Tsuji | .............. | G02B 7/102 396/542 |
| 2007/0195429 A1* | 8/2007 | Kobayashi | ............. | G02B 7/022 359/700 |
| 2014/0118842 A1* | 5/2014 | Nakamura | ............. | G02B 7/102 359/700 |
| 2014/0340777 A1* | 11/2014 | Konishi | ................ | G02B 7/12 359/826 |
| 2015/0205068 A1* | 7/2015 | Sasaki | ............... | G03B 3/10 359/700 |

FOREIGN PATENT DOCUMENTS

JP    11-174305    7/1999

* cited by examiner

*Primary Examiner* — Ricky Mack
*Assistant Examiner* — Daniele Manikeu
(74) *Attorney, Agent, or Firm* — John C. Pokotylo; Straub & Pokotylo (57) ABSTRACT

A lens barrel includes a barrel-shaped first barrel having a pair of cam grooves that have two cam locus curves congruent with each other and are separated from each other on a circumferential surface, and a second barrel that has a pair of cam pins formed of a first cam pin that is engaged with one of the pair of cam grooves and a second cam pin that is engaged with another of the pair of cam grooves, and an urging portion that urges the first cam pin in a radial direction of the first barrel, and moves in an optical axis direction relatively to the first barrel, and is configured such that in engagement of the pair of cam pins and the pair of cam grooves, a disposition distance between the pair of cam pins differs from a disposition distance between the pair of cam grooves.

19 Claims, 5 Drawing Sheets

LENS BARREL

CROSS REFERENCE TO RELATED APPLICATION

This application claims the benefit of Japanese Application No. 2014-246959 filed in Japan on Dec. 5, 2014, the contents of which are incorporated herein by this reference.

BACKGROUND OF THE INVENTION

1. Field of the Invention

The invention relates to a lens barrel including a structure that prevents backlash in engagement of a cam groove and a cam follower.

2. Description of the Related Art

Conventionally, an image pickup apparatus that picks up an image of an object is generally in a form in which a lens barrel, which is configured by having an image pickup optical system for forming an optical image of the object to be a target of image pickup, inside the lens barrel, is placed integrally with or attachably and detachably from an apparatus main body.

A lens barrel that is applied to the conventional image pickup apparatus is configured by including a plurality of optical lenses for configuring an image pickup optical system, a plurality of lens holding members that respectively hold the plurality of optical lenses and are formed into barrel shapes or frame shapes, a barrel member for driving and a drive source that are for causing a predetermined lens holding member of the plurality of lens holding members to perform advance and retreat movement in a direction along an optical axis, a drive mechanism that transmits a drive force of the drive source and the like.

The lens barrel which is disclosed by Japanese Patent Application Laid-Open Publication No. 11-174305, for example, has a cam barrel (a barrel member for driving) in which a cam groove is formed, and a lens holding barrel (a lens holding member) that includes a cam pin that performs cam coupling to the cam groove of the cam barrel, and holds some optical lenses of an image pickup optical system. The cam barrel rotates by receiving the drive force from the drive source, and thereby the cam pin moves in the cam groove, whereby the lens holding barrel is configured to move in a direction along the optical axis.

In the above case, a configuration is adopted, in which the cam grooves and the cam pins which are paired are placed at three spots substantially equidistantly in circumferential directions of the respective barrel members (the cam barrel and the lens holding barrel). Accordingly, the lens holding barrel is in a state in which the lens holding barrel is supported at the three spots that are the sites where the cam pins and the cam grooves perform cam coupling and is capable of performing advance and retreat movement, with respect to the cam barrel.

SUMMARY OF THE INVENTION

A lens barrel of one aspect of the present invention includes a barrel-shaped first barrel having a pair of cam grooves that have two cam locus curves congruent with each other, and are separated from each other on a circumferential surface, and a second barrel that has a pair of cam pins formed of a first cam pin that is engaged with one of the pair of cam grooves and a second cam pin that is engaged with another of the pair of cam grooves, and an urging portion that urges the first cam pin in a radial direction of the first barrel, and moves in a direction of an optical axis relatively to the first barrel, wherein in engagement of the pair of cam pins and the pair of cam grooves, a disposition distance between the pair of cam pins differs from a disposition distance between the pair of cam grooves.

The advantage of the invention will be more apparent from the following detailed explanation.

DETAILED DESCRIPTION OF THE PREFERRED EMBODIMENTS

Hereinafter, the present invention will be described based on an illustrated embodiment. One embodiment of the present invention illustrates a lens barrel that is applied to an image pickup apparatus that is configured by including an image display apparatus such as a liquid crystal display (liquid crystal display; LCD), and an organic electro-luminescence (organic EL; organic electro-luminescence; OEL) display, that sequentially performs photoelectric conversion of optical images that are formed by an image pickup optical system by using a photoelectric conversion device or the like (hereinafter, referred to as an image pickup device) such as a CCD (charge coupled device) image sensor, and a CMOS (complementary metal oxide semiconductor) type image sensor, stores image signals obtained thereby in a storage medium (a memory or a storage) as image data in a predetermined format (static images or digital image data of movie), and visibly displays the static images or the movie based on the digital image data stored in the storage medium.

Further, in the present embodiment, an optical axis of the image pickup optical system in the lens barrel is denoted by reference sign O. In a direction along the optical axis O, a side on which an object to be an image pickup target is located, and which faces a front surface of the image pickup apparatus to which the lens barrel is fitted, will be referred to as a front side, and a side on which a mount ring of the lens barrel is located will be referred to as a rear side.

Note that respective drawings for use in the following explanation are schematic illustration, and sometimes illustrate size relations, reduced scales and the like of the respective members by causing the size relations, reduced scales and the like to differ at each of respective components, in order to illustrate the respective components to such an extent to be recognizable on the drawings. Consequently, the present invention is not limited to only the illustrated forms, in regard with the numbers and quantities of the components, shapes of the components, the ratio of the sizes of the components, relative positional relations of the respective components and the like illustrated in the respective drawings.

Figure 1:
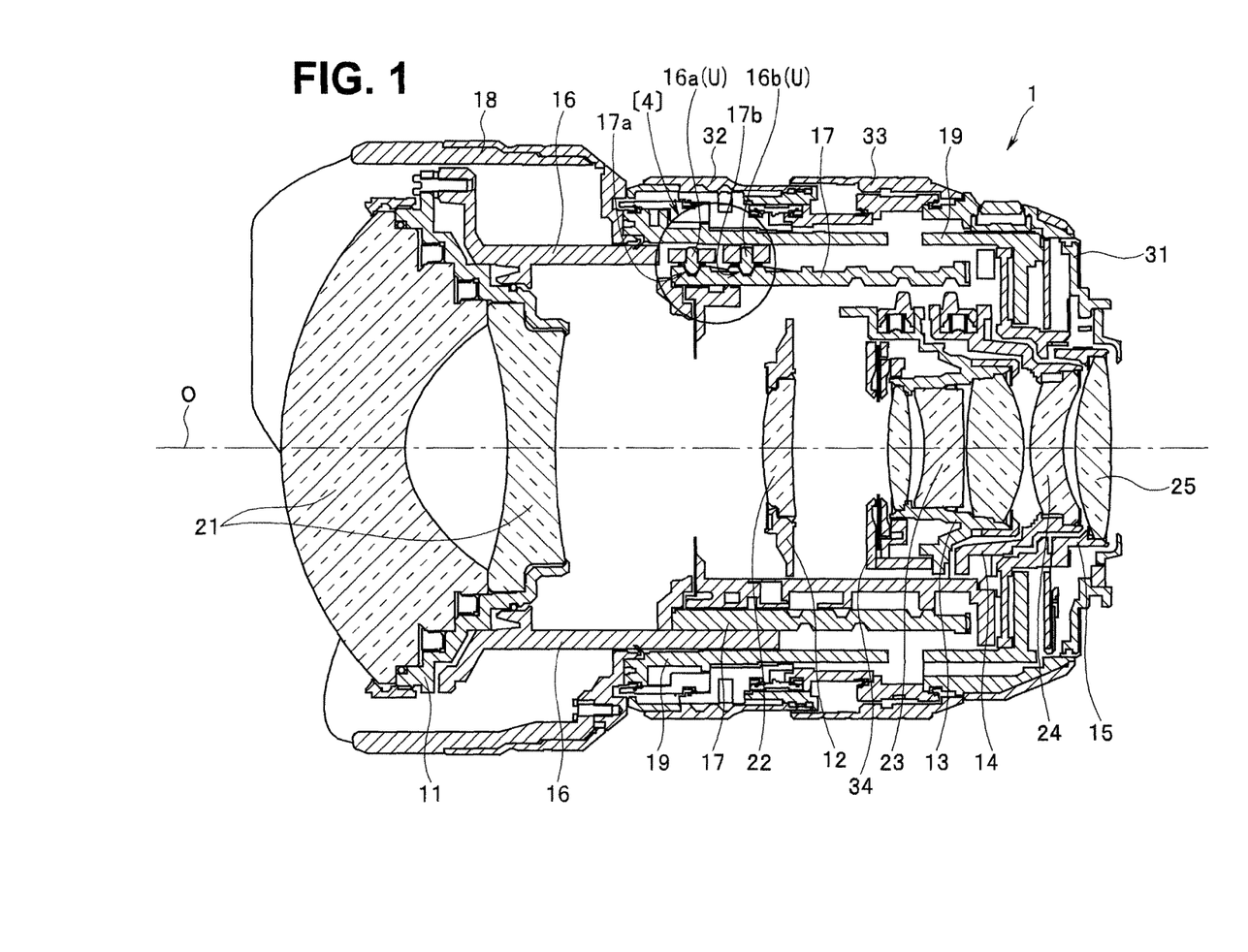
FIG. 1 is a vertical sectional view cut along a surface including an optical axis of a lens barrel of one embodiment of the present invention (a sectional view showing cam-coupled portions (two spots) that are disposed at an upper side from the optical axis)

First, a schematic configuration of a lens barrel of one embodiment of the present invention will be described hereinafter with use of FIG. 1. FIG. 1 is a vertical sectional view cut along a surface including an optical axis of the lens barrel of one embodiment of the present invention.

A lens barrel 1 of the present embodiment shows one example of a replaceable lens barrel in a form that is configured to be attachable and detachable to and from an apparatus main body (not illustrated) of the image pickup apparatus.

As shown in FIG. 1, the lens barrel 1 of the present embodiment is configured by having component members such as an image pickup optical system that is configured by a plurality of optical lenses (21, 22, 23, 24 and 25), a plurality of lens holding members (11, 12, 13, 14 and 15) that fix and hold the respective plurality of optical lenses, a movable lens holding barrel 16 that is a movable lens holding member, a cam barrel 17, a lens hood 18, a fixed barrel 19, a mount ring 31, a focus operation ring 32, a zoom operation ring 33 and a diaphragm device 34.

The plurality of optical lenses (21, 22, 23, 24 and 25) are, for example, a first lens group 21, a second lens group 22, a third lens group 23, a fourth lens group 24 and a fifth lens group 25 in sequence from a front surface side. Among these lens groups, the fifth lens group 25 is a fixed lens group that is fixed to a fixed portion inside the present lens barrel 1. Further, the first lens group 21, the second lens group 22, the third lens group 23 and the fourth lens group 24 are movable lens groups that are placed to be able to perform advance and retreat movement in a direction along the optical axis O inside the present lens barrel 1. More specifically, the second lens group 22, for example, is a focus lens group that mainly contributes to a focus control operation (focusing) by being caused to perform advance and retreat movement in the direction along the optical axis O by a drive source and a drive mechanism not illustrated. Further, the third lens group 23 and the fourth lens group 24, for example, are zoom lens groups that mainly contribute to a variable power operation (zooming).

The plurality of lens holding members (11, 12, 13, 14 and 15) are a first lens holding member 11 that holds the above described first lens group 21, a second lens holing member 12 that holds the second lens group 22, a third lens holding member 13 that holds the third lens group 23, a fourth lens holding member 14 that holds the fourth lens group 24, and a fifth lens holding member 15 that holds the fifth lens group 25 in sequence from a front surface side.

The movable lens holding barrel 16 is a barrel-shaped movable lens holding member that holds the first lens holding member 11 that fixes the movable lens group (the first lens group 21). The movable lens holding barrel 16 is configured by having a plurality of cam pins (16a and 16b) that are a plurality of cam followers which are provided to protrude toward an inner circumferential surface. The movable lens holding barrel 16 is configured integrally with the above described first lens holding member 11. By the configuration, the movable lens holding barrel 16 is placed inside the lens barrel 1 to be capable of performing advance and retreat movement in the direction along the optical axis O together with the above described first lens holding member 11.

The cam barrel 17 is a barrel-shaped member for drive and a first barrel member, which is configured by having a plurality of cam grooves (a first cam groove 17a and a second cam groove 17b) with which the plurality of cam pins (the first cam pin 16a and the second cam pin 16b) of the above described movable lens holding barrel 16 are engaged. The cam barrel 17 is placed inside the lens barrel 1 to be rotatable around the optical axis O by receiving a drive force from the drive source (a drive motor and the like) not illustrated.

Here, the above described cam barrel 17 is internally fitted in the above described movable lens holding barrel 16. The above described movable lens holding barrel 16 is a second barrel that moves in the optical axis O direction relatively to the above described cam barrel 17 (a first barrel). Note that detailed configurations of the movable lens holding barrel 16 and the cam barrel 17 will be described later.

The lens hood 18 is a unnecessary light shielding member that is fixedly provided at a distal end portion of the lens barrel 1, and is provided to block a luminous flux which is unnecessary to form an optical image among luminous fluxes that are incident on the image pickup optical system from the front surface side of the lens barrel 1, from being incident on the image pickup optical system.

The fixed barrel 19 is a barrel-shaped member that fixes and supports various component members such as the fifth lens holding member 15 which holds the above described fixed lens group (25), and supports lens holding barrels that hold other movable lens groups relatively movably.

The mount ring 31 is a connection member for connecting the lens barrel 1 and the image pickup apparatus with a bayonet or the like by being engaged with a mount portion that is provided at a front surface of an apparatus main body (not illustrated) of the image pickup apparatus.

The focus operation ring 32 and the zoom operation ring 33 are ring-shaped operation members that are disposed at an outermost circumferential surface of the lens barrel 1, and are placed rotatably around the optical axis O. The focus operation ring 32 is the operation member which is mainly operated when a focus control operation (focusing) is performed. The zoom operation ring 33 is the operation member which is mainly operated when a variable power operation (zooming) is performed.

The diaphragm device 34 is a light amount control device for controlling an amount of light that passes through the image pickup optical system of the present lens barrel 1. Note that a configuration of the diaphragm device itself is a part that is not related to the present invention, and therefore, explanation of a detailed configuration of the diaphragm device will be omitted.

Note that the lens barrel 1 of the present embodiment is configured by also including various component members in addition to the aforementioned respective component members. For example, various component members are included, such as a drive source for the diaphragm device 34, in addition to the drive source (the drive motor and the like) for causing the above described movable lens holding barrel 16 to perform advance and retreat movement in the direction along the optical axis O, and a drive force transmission mechanism that transmits a rotational drive force that is generated from the drive source to the above described cam barrel 17. However, since the component members are parts that are not directly related to the present invention, illustration of the component members is omitted in FIG. 1, in order to avoid complication of the drawing, and detailed explanation of the component members will be omitted.

Figure 2:
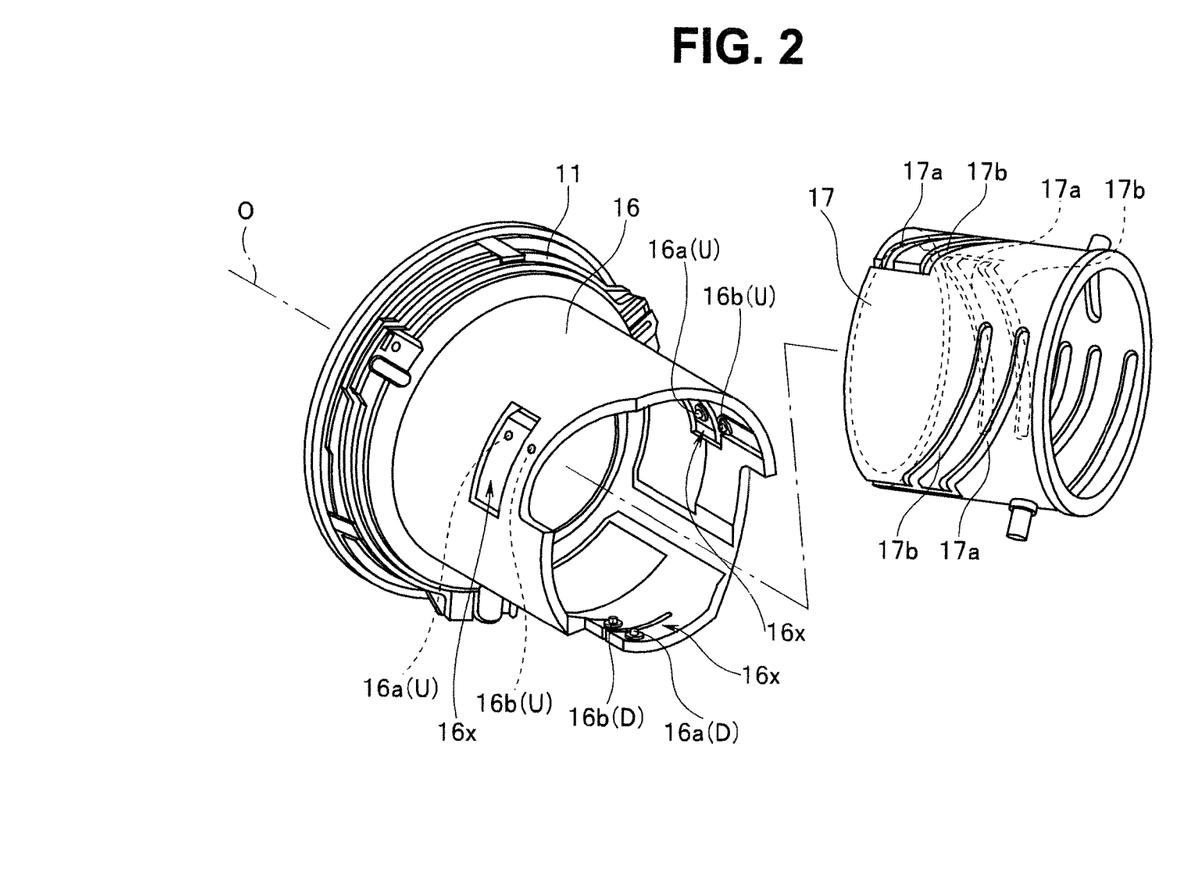
FIG. 2 is an exploded perspective view showing a movable lens holding barrel and a cam barrel in the lens barrel in FIG. 1 by taking out the movable lens holding barrel and the cam barrel.
Figure 3:
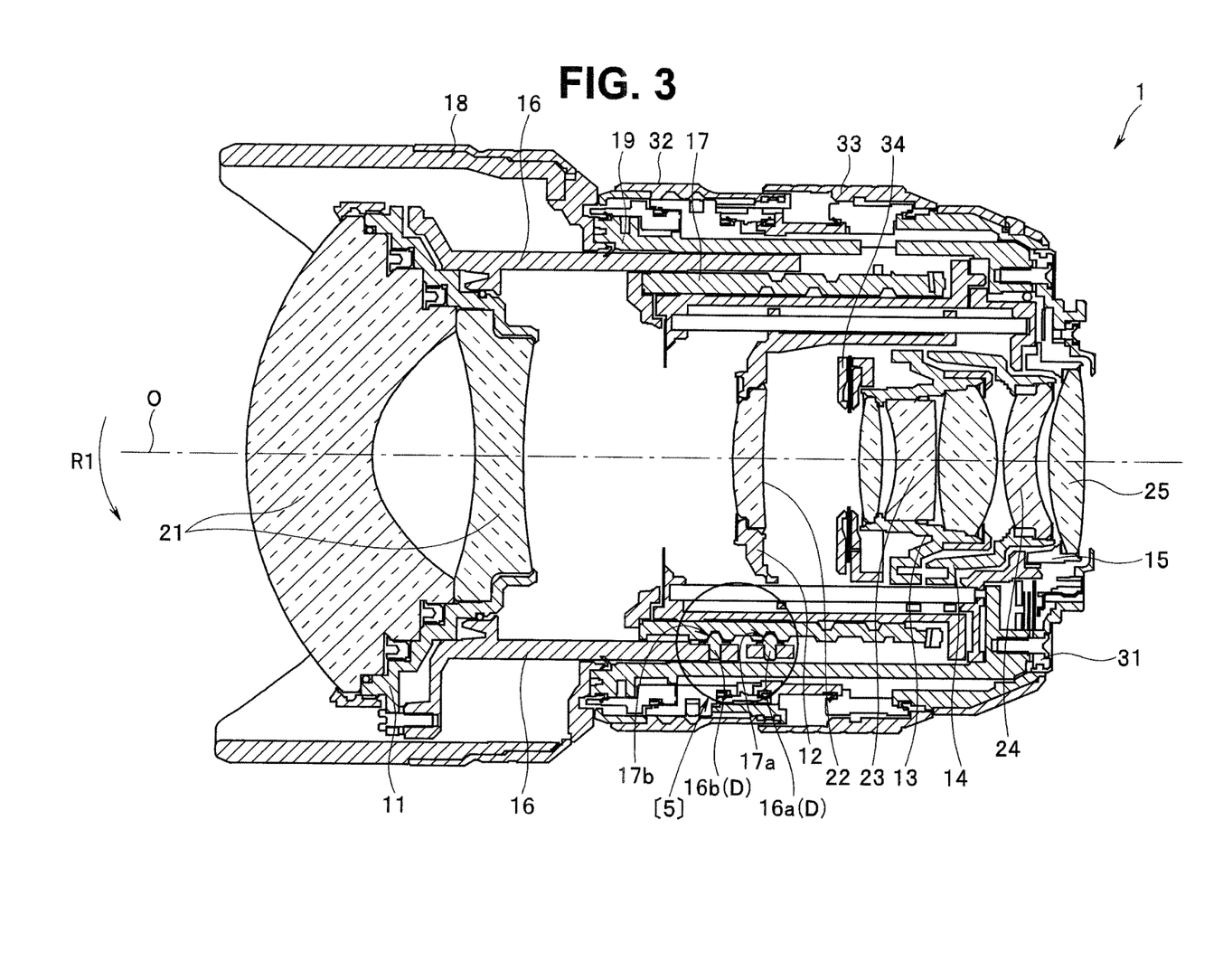
FIG. 3 is a vertical sectional view cut along the surface including the optical axis of the lens barrel of one embodiment of the present invention (a sectional view showing a cam-coupled portion (one spot) that is disposed at a lower side from the optical axis)
Figure 4:
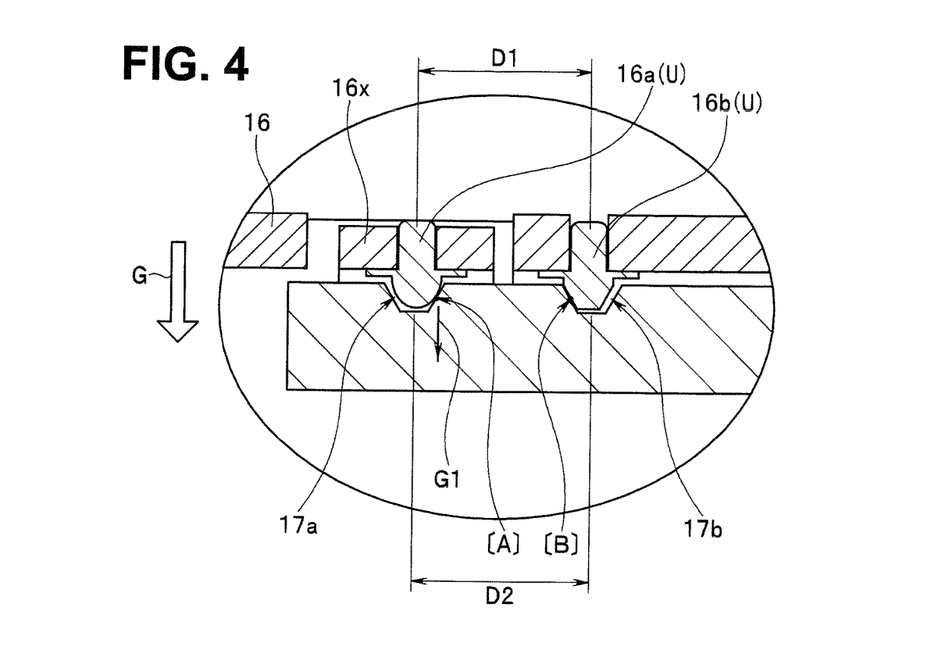
FIG. 4 is an essential part enlarged sectional view of a portion shown by reference sign [4] in FIG. 1 (an upper side cam-coupled portion)
Figure 5:
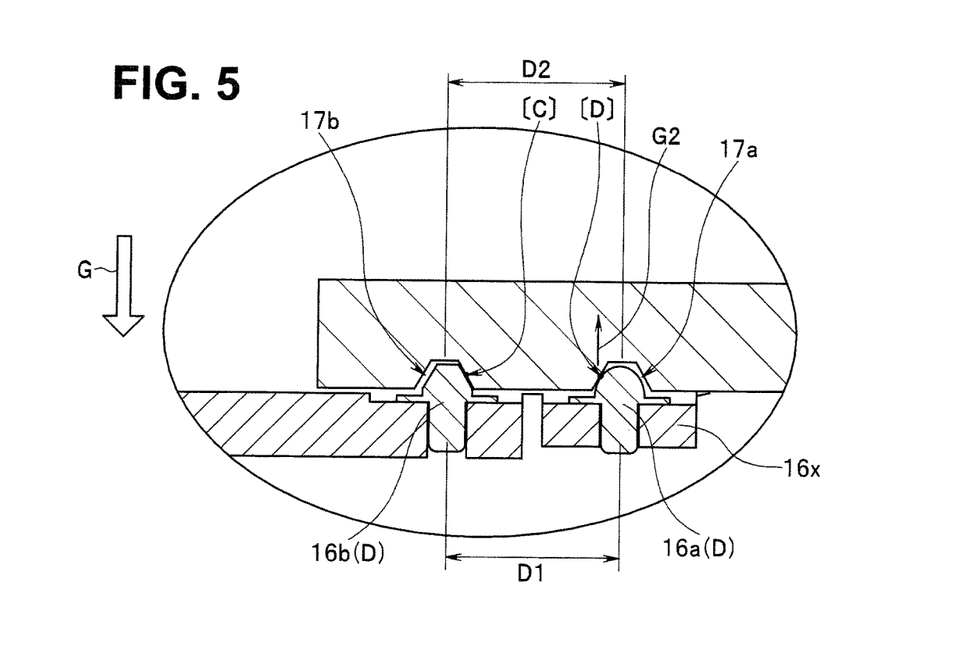
FIG. 5 is an essential part enlarged sectional view of a portion shown by reference sign [5] in FIG. 3 (a lower side cam-coupled portion)

In the lens barrel 1 of the present embodiment which is configured as above, the movable lens holding barrel 16 and the cam barrel 17 are taken out, and configurations of both the movable lens holding barrel 16 and the cam barrel 17 will be described in more detail. FIG. 2 is an exploded perspective view showing the movable lens holding barrel and the cam barrel in the lens barrel 1 in the present embodiment by taking out the movable lens holding barrel and the cam barrel. Further, FIG. 3 is a vertical sectional view cut along a surface including the optical axis of the lens barrel in one embodiment of the present invention, similarly to FIG. 1. Here, FIG. 1 shows a section that is cut along a cam coupling portion (either one of two spots) that is disposed at an upper side from the optical axis out of cam coupling portions (three spots) of the cam pins of the movable lens holding barrel and the cam grooves of the cam barrel, in a case where the lens barrel 1 is placed in a normal use state. Further, FIG. 3 shows a section that is cut along a cam coupling portion (one spot) that is disposed at a lower side from the optical axis out of the cam coupling portions which are located at the three spots in the case similar to FIG. 1 (the case where the lens barrel 1 is placed in the normal use state). FIG. 4 is an essential part enlarged sectional view of a part (the upper side cam coupling portion) shown by reference sign [4] in FIG. 1. FIG. 5 is an essential part enlarged sectional view of a part (the lower side cam coupling portion) shown by reference sign [5] in FIG. 3.

As shown in FIG. 3, and as described above, the first lens holding member 11 is configured integrally with the movable lens holding barrel 16. The plurality of cam pins (16a and 16b) that protrude inward in a radial direction are placed on an inner circumferential surface of the movable lens holding barrel 16.

On an inner circumferential side of the movable lens holding barrel 16, the cam barrel 17 is placed rotatably around the optical axis O. In other words, the movable lens holding barrel 16 is disposed by being externally fitted on an outer circumferential side of the cam barrel 17. In this case, the above described plurality of cam pins (16a and 16b) perform cam coupling to the plurality of cam grooves (17a and 17b) which are formed on a circumferential surface of the cam barrel 17.

Here, as the above described plurality of cam pins, pairs of first cam pins 16a and second cam pins 16b are placed at three spots substantially equidistantly along a circumferential direction of the movable lens holding barrel 16. Specifically, the above described pair of cam pins (16a and 16b) are placed at each of the three spots spaced every angle of approximately 120 degrees along the circumferential direction of the movable lens holding barrel 16.

The plurality of cam grooves (17a and 17b) are formed on the circumferential surface of the cam barrel 17 in correspondence to the above described pairs of the cam pins (16a, 16b). Here, as the above described plurality of cam grooves, pairs of cam grooves each formed of the first cam groove 17a and the second cam groove 17b which have same cam locus curves congruent with each other and are separated from each other on the circumferential surface are placed at three spots substantially equidistantly along the circumferential direction of the cam barrel 17. Specifically, the above described pair of cam grooves (17a and 17b) are placed at each of the three spots spaced every angle of approximately 120 degrees along the circumferential direction of the cam barrel 17.

Note that the above described plurality of cam pins (16a and 16b) and the above described plurality of cam grooves (17a and 17b) are disposed as follows.

First, when the lens barrel 1 is placed in the normal use state, specifically, when the lens barrel 1 is in a state where the lens barrel 1 is attached in a regular state to a predetermined site of the front surface of the apparatus main body (not illustrated) of the image pickup apparatus, and the image pickup apparatus is in a state where the image pickup apparatus can execute an image pickup operation in a normal posture, that is, in a state in which the front surface of the lens barrel 1 is directed to an object to be photographed, the cam coupling portions at the two spots (component portions including the cam pins 16a (U) and 16b (U) assigned with reference sign "U" in FIG. 2) are disposed at the upper side from the optical axis O, and the cam coupling portion at the other one spot (a component portion including the cam pins 16a (D) and 16b(D) assigned with reference sign "D" in FIG. 2) is disposed at the lower side from the optical axis O, among the cam coupling portions (the three spots) of the plurality of cam pins (16a and 16b) of the movable lens holding barrel 16 and the plurality of cam grooves (17a and 17b) of the cam barrel 17.

Therefore, the cam coupling portions (the component portions including the cam pins 16a (U) and 16b (U)) at the two spots which are disposed at the upper side from the optical axis O when the lens barrel 1 is in the normal state will be described as the upper side cam coupling portions. Further, likewise, the cam coupling portion (the component portion including the cam pins 16a (D) and 16b (D)) at the one spot which is disposed at the lower side from the optical axis O will be described as a lower side cam coupling portion.

In this case, the lower side cam coupling portion (refer to the component portion including the cam pins 16a (D) and 16b (D) in FIG. 2) is disposed in a substantially vertical direction with respect to a horizontal plane including the optical axis O, as shown in FIG. 3. Further, the upper side cam coupling portions at the two spots (refer to the component portions including the cam pins 16a (U) and 16b (U) in FIG. 2) are respectively disposed at positions with a separation angle of substantially 120 degrees in each of a normal and an opposite circumferential directions around the optical axis O with respect to a placement site of the above described lower side cam coupling portion.

The above described pair of cam pins (16a and 16b) is provided to protrude inward in the radial direction on the inner circumferential surface of the movable lens holding barrel 16 as described above. In this case, a site (a site denoted by reference sign 16x in FIG. 2) where a fixed end of the first cam pin 16a which is one of the above described pair of cam pins (the first cam pin 16a and the second cam pin 16b) is disposed, is in a form which is cut out in three directions of a circumferential region, as shown in FIG. 2, and is formed into a cantilever shape in such a form that connects to the circumferential surface of the movable lens holding barrel 16 in a remaining one site. Here, the movable lens holding barrel 16 is formed by using a raw material such as a resin molded product. Accordingly, the site (the site denoted by reference sign 16x) is configured to have an urging force by elasticity of the raw material by being formed into the cantilever shape. Therefore, the site (the site denoted by reference sign 16x) will be called the cantilever-shaped portion 16x hereinafter. That is, the first cam pin 16a is fixedly provided at the cantilever-shaped portion 16x which is the portion in the shape elastically deformable in the radial direction of the above described cam barrel 17, and is an urging portion that fixes and holds the cam pin and has the urging force in the radial direction. In the case of the present embodiment, a direction of the urging force is directed to an inner radius direction in which the cam barrel is located. With respect to the first cam pin 16a, the other second cam pin 16b is placed by the side of the first cam pin 16a in the direction along the optical axis O. Here, the above described second cam pin 16b is fixed to and provided at a fixing portion on the inner circumferential surface of the movable lens holding barrel 16 to protrude inward in the radial direction.

Further, in this case, a sequence of disposition of the first cam pin 16a and the second cam pin 16b is set as follows. That is, in the upper side cam coupling portions (the two spots), the first cam pins 16a (the cantilever-shaped portions 16x) are placed at sites to the front, and the second cam pins 16b are placed at a site to a rear end. In the lower side cam coupling portion (the one spot), the second cam pin 16b is placed at a site to the front, and the first cam pin 16a (the cantilever-shaped portion 16x) is placed at a site to the rear end.

Note that in the upper side cam coupling portions (the two spots), the first cam grooves 17a are formed at sites to the front by being brought into correspondence with the first cam pins 16a at the sites to the front, and the second cam grooves 17b are formed at sites to the rear end by being brought into correspondence with the second cam pins 16b at the site to the rear end. On the contrary, in the lower side cam coupling portion (the one spot), the second cam groove 17b is formed at a site to the front by being brought into correspondence with the second cam pin 16b at the site to the front, and the first cam groove 17a is formed at a site to the rear end by being brought into correspondence with the first cam pin 16a at the site to the rear end (refer to FIG. 2).

Further, a space dimension (a disposition distance) between the above described pair of cam pins (16a and 16b) and a space dimension (a disposition distance) between the above described pair of cam grooves (17a and 17b) are set to differ from each other. Specifically, in the present embodiment, the space dimension (the disposition distance) between the above described pair of cam pins (16a and 16b) is set to be slightly small relatively to the space dimension (the disposition distance) between the above described pair of cam grooves (17a and 17b). That is, in FIGS. 4 and 5, the space dimension between the pair of cam pins (16a and 16b) is denoted by reference sign D1, and the space dimension between the pair of cam grooves (17a and 17b) is denoted by reference sign D2. In this case, D1 and D2 are set to satisfy

D1<D2.

In the lens barrel 1 of the present embodiment which is configured as above, the movable lens holding barrel 16 and the cam barrel 17 operate as follows.

When the lens barrel 1 is in the normal use state, for example, is in a state shown in FIG. 3, the lower side cam coupling portion (refer to 16a (D) and 16b(D)) is disposed in the substantially vertical direction with respect to the horizontal plane including the optical axis O.

Here, as described above, the first lens holding member 11 which holds the first lens group 21 is fixedly provided at the distal end portion of the movable lens holding barrel 16, and the cam barrel 17 is internally fitted and disposed rotatably inside the movable lens holding barrel 16. Accordingly, in this state, the cam barrel 17 supports the movable lens holding barrel 16 at the plurality of cam coupling portions. As described above, relatively weighty structures (the first lens group 21 and the first lens holding member 11) are fixedly provided at a distal end side of the movable lens holding barrel 16, and thereby in the movable lens holding barrel 16, a weight balance leans toward the distal end side. Therefore, when the lens barrel 1 is in the normal state, the movable lens holding barrel 16 receives the gravity G in the vertical direction (refer to FIG. 4), and the distal end side receives power to a rotational direction (an arrow R1 direction in FIG. 3) with respect to the cam barrel 17.

At this time, in each of the upper side cam coupling portions (the two spots; refer to 16a (U) and 16b (U)), the first cam pin 16a (U) which is fixedly provided at the cantilever-shaped portion 16x is brought into a state in which the first cam pin 16a (U) abuts on a rear side inclined surface portion [A] in FIG. 4 and is pressed to the first cam groove 17a while elastically deforming, as shown in FIG. 4. At the same time, the second cam pin 16b (U) which is fixedly provided at the fixed portion of the movable lens holding barrel 16 is brought into a state in which the second cam pin 16b (U) abuts on a front side inclined surface portion [B] in FIG. 4 and is pressed to the second cam groove 17b. At this time, the first cam pin 16a (U) is pressed to the first cam groove 17a by a pressing force in the vertical direction (an arrow G1 direction in FIG. 4). Here, the space dimension D1 between the pair of cam pins (16a and 16b) is set to be slightly small with respect to the space dimension D2 between the pair of cam grooves (17a and 17b) (D1<D2), and therefore, in the cam coupling portion, backlash in engagement of the cam pin and the cam groove is removed.

Likewise, as shown in FIG. 5, in the lower side cam coupling portion (the one spot; refer to 16a (D) and 16b (D)), the second cam pin 16b (D) which is fixedly provided at the fixed portion of the movable lens holding barrel 16 is brought into a state in which the second cam pin 16b (D) abuts on a rear side inclined surface portion [C] in FIG. 5 and is pressed to the second cam groove 17b. At the same time, the first cam pin 16a (D) which is fixedly provided at the cantilever-shaped portion 16x is brought into a state in which the first cam pin 16a (D) abuts on a front side inclined portion [D] in FIG. 5 and is pressed to the first cam groove 17a while elastically deforming. At this time, the first cam pin 16a (D) is pressed to the first cam groove 17a by a pressing force in an opposite direction (an arrow G2 direction in FIG. 5) from the vertical direction. Here, the space dimension D1 between the pair of cam pins (16a and 16b) is also set to be slightly small relatively to the space dimension D2 between the pair of the cam grooves (17a and 17b) (D1<D2), and therefore, backlash in engagement of the cam pin and the cam groove is also removed in the cam coupling portion.

As described above, according to the above described first embodiment, in the lens barrel 1, at a time of the movable lens holding barrel 16 and the cam barrel 17 being connected by cam coupling, the one cam pin 16a of the pair of cam pins (16a and 16b) which perform cam coupling to the pair of cam grooves (17a and 17b) which have the same cam locus curves congruent with each other and are separated from each other on the circumferential surface is configured to be fixedly provided at the cantilever-shaped portion 16x which is the portion having elasticity in the movable lens holding barrel 16. According to the configuration, the backlash in the engagement between the above described pair of cam pins (16a and 16b) and the above described pair of cam grooves (17a and 17b) can be removed.

Further, in this case, the space dimension D1 in the optical axis O direction between the above described pair of cam pins (16a and 16b) is configured to be slightly narrowed, with respect to the space dimension D2 in the optical axis O direction between the above described pair of cam grooves (17a and 17b) (D1<D2). According to the configuration, a direction in which the backlash in engagement occurs can be specified to be in one direction, and therefore, if the movable lens holding barrel 6 is disposed to be pressed in the specified one direction, the backlash in the engagement can be easily removed.

Furthermore, in the upper side cam coupling portions (the two spots; refer to 16a (U) and 16b (U)) and the lower side cam coupling portion (the one spot; refer to 16a (D) and 16b (D)), dispositions in the direction along the optical axis O of the first cam pins 16a and the second cam pins 16b are set to be opposite from each other, the weight of the movable lens holding barrel side 16 can be received properly in all the cam coupling sites, in response to the load powers in the abutment sites of the respective cam pins and the respective cam grooves differing depending on the weight balance at the movable lens holding barrel 16 side. Accordingly, the posture of the movable lens holding barrel 16 can be always kept in a stable state thereby, and favorable optical performance can be kept.

Note that in the lens barrel 1 of the one embodiment described above, the space dimension D1 in the optical axis O direction between the above described pair of cam pins (16a and 16b) is configured to be slightly narrowed, with respect to the space dimension D2 in the optical axis O direction between the above described pair of cam grooves (17a and 17b) (D1<D2). However, setting of the respective space dimensions between the cam grooves and the cam pins is not limited to the example.

Figure 6:
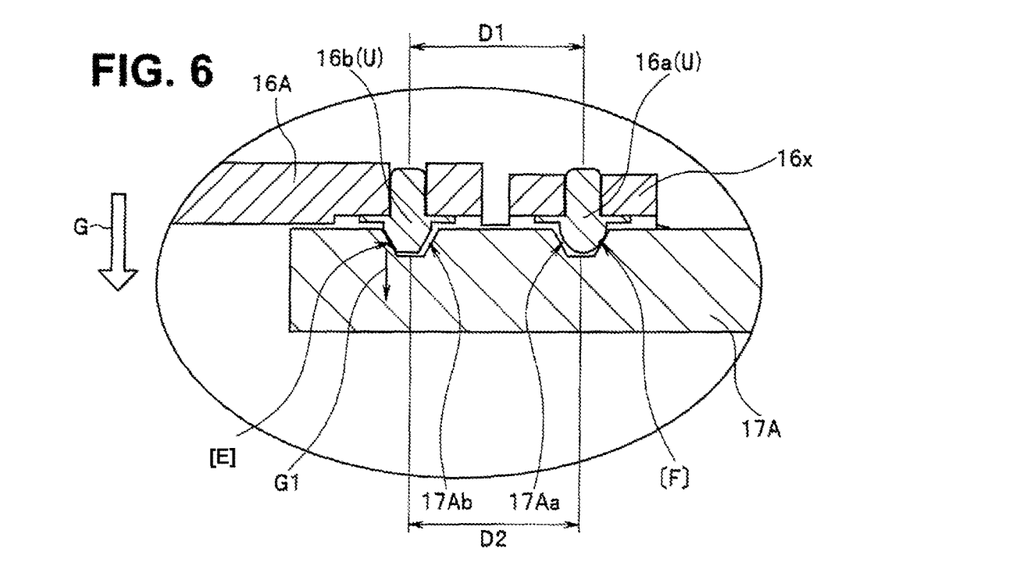
FIG. 6 is an essential part enlarged sectional view of an upper side cam-coupled portion in a modification of one embodiment of the present invention.
Figure 7:
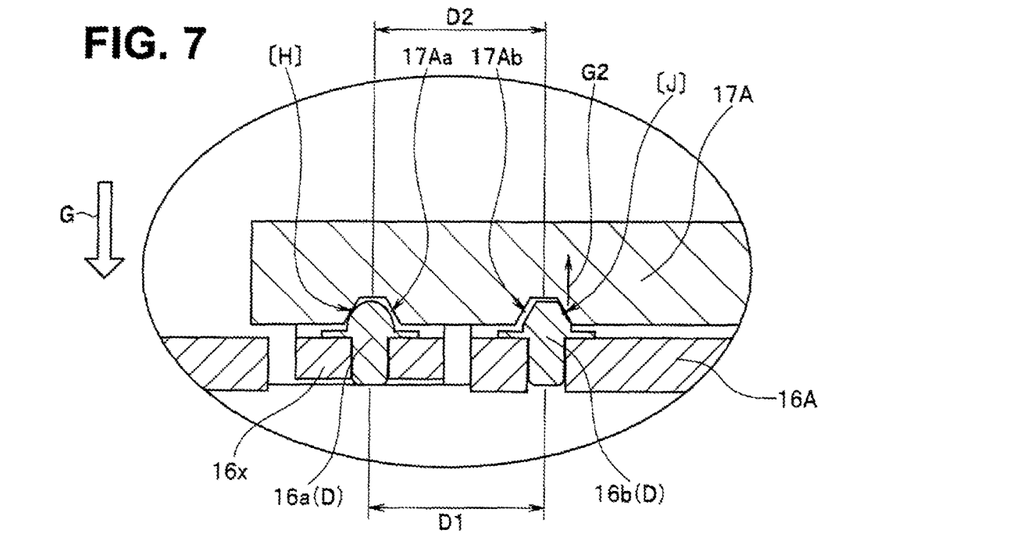
FIG. 7 is an essential part enlarged sectional view of a lower side cam-coupled portion in the modification in FIG. 6.

For example, contrary to the aforementioned one embodiment, in a modification shown in FIGS. 6 and 7, the space dimension D1 in the optical axis O direction between the above described pair of cam pins (16a and 16b) may be configured to be slightly large, with respect to the space dimension D2 in the optical axis O direction between the above described pair of cam grooves (17a and 17b) (D1>D2). Further, when the configuration is adopted, in the upper side cam coupling portions (the two spots), the second cam pins 16b are placed at sites to the front, and the first cam pins 16a (the cantilever-shaped portions 16x) are placed at sites to the rear end. In the lower side cam coupling portion (the one spot), the first cam pin 16a (the cantilever-shaped portion 16x) is placed at a site to the front, and the second cam pin 16b is placed at a site to the rear end.

The movable lens holding barrel and the cam barrel in the lens barrel in the case of the configuration as above operate as follows. Here, in the modification, a movable lens holding barrel 16A and a cam barrel 17A are adopted as shown in FIGS. 6 and 7.

When a lens barrel in the modification is in a normal use state (at a time of being in a state equivalent to FIG. 3), in each of the upper side cam coupling portions (the two spots; refer to 16a (U) and 16b (U)), the second cam pin 16b (U) which is fixedly provided at a fixed portion of the movable lens holding barrel 16A is brought into a state in which the second cam pin 16b (U) abuts on a front side inclined surface portion [E] in FIG. 6 and is pressed to a second cam groove 17Ab, as shown in FIG. 6. At the same time, the first cam pin 16a (U) which is fixedly provided at the cantilever-shaped portion 16x is brought into a state in which the first cam pin 16a (U) abuts on a rear side inclined surface portion [F] in FIG. 6 and is pressed to a first cam groove 17Aa while elastically deforming. At this time, the second cam pin 16b (U) is pressed to the second cam groove 17Ab by a pressing force in the vertical direction (an arrow G1 direction in FIG. 6). Thereby, in the cam coupling portions, backlashes in engagement of the cam pins and the cam grooves are removed.

Likewise, in the lower side cam coupling portion (the one spot; refer to 16a (D) and 16b (D)), as shown in FIG. 7, the first cam pin 16a (D) which is fixedly provided at the cantilever-shaped portion 16x is brought into a state in which the first cam pin 16a (D) abuts on a front side inclined surface portion [H] in FIG. 7 and is pressed to the first cam groove 17Aa while elastically deforming. At the same time, the second cam pin 16b (D) which is fixedly provided at the fixed portion of the movable lens holding barrel 16A is brought into a state in which the second cam pin 16b (D) abuts on a rear side inclined surface portion [J] in FIG. 7 and is pressed to the second cam groove 17Ab. At this time, the second cam pin 16b (D) is pressed to the second cam groove 17Ab with a pressing force in an opposite direction (an arrow G2 direction in FIG. 7) from the vertical direction. Thereby, in the cam coupling portion, backlash in engagement of the cam pin and the cam groove is removed.

By the configuration according to the modification described above, an effect similar to the effect of the above described one embodiment can be obtained. Further, when the cam pins in the above described one embodiment and modification are summarized as above, it can be said that in the above described pairs of cam pins which are above the optical axis, the above described first cam pins are rearward in the optical axis from the above described second cam pins, and in the above described pair of cam pins which are below the above described optical axis, the above described first cam pin is forward in the optical axis from the above described second cam pin.

Note that the cantilever-shaped portion 16x is not limited to the above form and may be in a form of a both-end supported beam as long as the portion has a spring property.

Furthermore, as another modification, the cantilever-shaped portion 16x is not formed integrally with the barrel, and may be formed separately from the barrel into a form given a spring property by using a flat spring member. Specifically, a form is conceivable, in which a cutout is provided in the movable lens holding barrel 16 by the cantilever-shaped portion 16x of the present embodiment being eliminated, the cam pin is placed at a distal end that is one end of the flat spring, and the other end is disposed in the cutout of the movable lens holding barrel 16.

In addition, an alignment relationship between the first cam pin and second cam pin that constitute the pair of cam pins does not have to be parallel to the optical axis. For example, the alignment relationship between the first cam pin and the second cam pin of the pair of cam pins may be oblique with respect to the optical axis. In other words, the first cam pin and the second cam pin of the pair of cam pins may be arranged at positions shifted in the circumferential direction of the lens holding barrel. In this case, also the pair of cam grooves corresponding to the pair of cam pins is inevitably formed such that each cam groove of the pair of cam grooves engages with each cam pin of the pair of cam pins.

When the first cam pin and the second cam pin of the pair of cam pins are aligned so as to be oblique with respect to the optical axis, as described above, the distance between the first cam pin and the second cam pin can be represented by the distance along a straight line that is oblique with respect to the optical axis. The distance along the oblique straight line is normally able to be divided into a straight line component parallel to the optical axis and a straight line component perpendicular to the optical axis. In the configuration of the present invention, the alignment relationship between the first cam pin and the second cam pin is surely required to have the straight line component parallel to the optical axis. In other words, in the configuration of the present invention, the alignment relationship between the first cam pin and the second cam pin of the pair of cam pins has to be an alignment relationship other than an alignment relationship in which the first cam pin and the second cam pin are aligned in the direction perpendicular to the optical axis, i.e., the circumferential direction of the lens holding barrel.

The present invention is not limited to the aforementioned embodiment, and various modifications and applications can be carried out within the range without departing from the gist of the invention as a matter of course. Further, in the above described embodiment, the inventions at various stages are included, and by proper combination of a plurality of constituent features which are disclosed, various inventions can be extracted. For example, when the problem to be solved by the invention can be solved, and the effect of the invention is obtained, even if some constituent features are deleted from all the constituent features which are shown in the above described one embodiment, the configuration from which the constituent features are deleted can be extracted as the invention. Further, the components across different embodiments may be properly combined. The invention is not limited by a specific embodiment except that the invention is limited by the appended claims.

What is claimed is:

1. A lens barrel, comprising:
a barrel-shaped first barrel having a pair of cam grooves that have two cam locus curves congruent with each other, and are disposed so as to be separated from each other on a circumferential surface; and
a second barrel comprising: a pair of cam pins including a first cam pin that is engaged with one of the pair of cam grooves and a second cam pin that is engaged with another of the pair of cam grooves, wherein a disposition distance between the first cam pin and the second cam pin differs from a disposition distance between the pair of cam grooves; and an urging portion that urges the first cam pin in a radial direction of the first barrel, the second barrel being configured to move in a direction of an optical axis relatively to the first barrel.

2. The lens barrel according to claim 1,
wherein in the engagement of the pair of cam pins and the pair of cam grooves, the disposition distance between the pair of cam pins is smaller than the disposition distance between the pair of cam grooves.

3. The lens barrel according to claim 1,
wherein in the engagement of the pair of cam pins and the pair of cam grooves, the disposition distance between the pair of cam pins is larger than the disposition distance between the pair of cam grooves.

4. The lens barrel according to claim 1,
wherein the pair of cam pins are arranged in the direction of the optical axis.

5. The lens barrel according to claim 2,
wherein the pair of cam pins are arranged in the direction of the optical axis.

6. The lens barrel according to claim 3,
wherein the pair of cam pins are arranged in the direction of the optical axis.

7. The lens barrel according to claim 1,
wherein the pair of cam grooves in plurality and the pair of cam pins in plurality that are equal in numbers are included.

8. The lens barrel according to claim 2,
wherein the pair of cam grooves in plurality and the pair of cam pins in plurality that are equal in numbers are included.

9. The lens barrel according to claim 3,
wherein the pair of cam grooves in plurality and the pair of cam pins in plurality that are equal in numbers are included.

10. The lens barrel according to claim 4,
wherein the pair of cam grooves in plurality and the pair of cam pins in plurality that are equal in numbers are included.

11. The lens barrel according to claim 7,
wherein out of the plurality of pairs of cam pins, at least the pair of cam pins are arranged in the direction of the optical axis.

12. The lens barrel according to claim 7,
wherein in the pair of cam pins which are above the optical axis, the first cam pin is rearward in the optical axis from the second cam pin, and
in the pair of cam pins which are below the optical axis, the first cam pin is forward in the optical axis from the second cam pin.

13. The lens barrel according to claim 1,
wherein the urging portion is formed into a cantilever shape.

14. The lens barrel according to claim 1,
wherein the urging portion is formed by a flat spring member.

15. The lens barrel according to claim 1,
wherein the disposition distance between the pair of cam grooves is a distance on a line segment connecting the pair of cam pins between the one of the pair of cam grooves with which the first cam pin is engaged and the other of the pair of cam grooves with which the second cam pin is engaged.

16. The lens barrel according to claim 1 wherein the combination of (1) the disposition distance between the first cam pin and the second cam pin differing from the disposition distance between the pair of cam grooves, and (2) the urging portion that urges the first cam pin in the radial direction of the first barrel, reduces backlash in engagement of the first and second cam pins with their respective cam grooves.

17. The lens barrel according to claim 1,
wherein the first cam pin and second cam pin are provided at different positions on the optical axis,
wherein the disposition distance is a component of distance solely in a direction of the optical axis.

18. The lens barrel according to claim 1,
wherein the disposition distance between the pair of cam groves is a distance between two engaging points of the pair of cam grooves with their respective cam pins.

19. A lens barrel, comprising:
a barrel-shaped first barrel having a pair of cam grooves that have two cam locus grooves congruent with each other, and are disposed so as to be separated from each other on a circumferential surface; and
a second barrel comprising: a pair of cam pins located close to each other and including a first cam pin that is engaged with one of the pair of cam grooves and a second cam pin that is engaged with another of the pair of cam grooves, wherein a disposition distance between the first cam pin and the second cam pin differs from a distance on a line segment connecting the pair of cam pins between the one of the pair of cam grooves with which the first cam pin is engaged and the other of the pair of cam grooves with which the second cam pin is engaged; and urging means that urges the first cam pin in a radial direction of the first barrel, the second barrel being configured to move in a direction of an optical axis relatively to the first barrel.

* * * * *